United States Patent
Simeonidis et al.

(10) Patent No.: US 9,821,687 B2
(45) Date of Patent: Nov. 21, 2017

(54) SEAT SYSTEM FOR A VEHICLE

(71) Applicant: Johnson Controls Technology Company, Plymouth, MI (US)

(72) Inventors: Antonios Simeonidis, Wuppertal (DE); Ivan Krizic, Bergisch Gladbach (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 15/100,036

(22) PCT Filed: Aug. 14, 2014

(86) PCT No.: PCT/EP2014/067434
§ 371 (c)(1),
(2) Date: May 27, 2016

(87) PCT Pub. No.: WO2015/078599
PCT Pub. Date: Jun. 4, 2015

(65) Prior Publication Data
US 2017/0001545 A1    Jan. 5, 2017

(30) Foreign Application Priority Data

Nov. 29, 2013  (DE) .......................... 10 2013 224 605

(51) Int. Cl.
*A47C 15/00*    (2006.01)
*B60N 2/30*     (2006.01)
*B60N 2/015*    (2006.01)

(52) U.S. Cl.
CPC ........... *B60N 2/3009* (2013.01); *B60N 2/015* (2013.01); *B60N 2/3013* (2013.01); *B60N 2205/35* (2013.01)

(58) Field of Classification Search
CPC .... B60N 2/015; B60N 2/3009; B60N 2/3013; B60N 2205/35
(Continued)

(56) References Cited

U.S. PATENT DOCUMENTS 3,666,314 A    5/1972  Makinen et al.
5,290,090 A *  3/1994  Bell .......................... B60N 2/36
                                                    297/238
(Continued)

FOREIGN PATENT DOCUMENTS

CN    101 439 686 A    5/2009
CN    101 511 636 A    8/2009
(Continued)

OTHER PUBLICATIONS

Chinese Office Action dated Mar. 29, 2017, including English translation.

*Primary Examiner* — Rodney B White
(74) *Attorney, Agent, or Firm* — McGlew and Tuttle, P.C.

(57) ABSTRACT

A seat system (1) for a vehicle, includes a plurality of seats (2.1 to 2.3) which are disposed next to one another and at least two of which are pivotable about a common pivot axis (S). At least one of the seats (2.2) that are pivotable about the common pivot axis (S) is designed in such a way that when the seat is unlocked and the backrest thereof is pivoted by more than a predefined angle of inclination, the adjacent other seat (2.1) is blocked in the unlocked state or at least the folding movement of the backrest thereof is dampened or prevented.

9 Claims, 4 Drawing Sheets (58) Field of Classification Search
USPC .......................................................... 297/238
See application file for complete search history.

(56) References Cited

U.S. PATENT DOCUMENTS

| | | | | |
|---|---|---|---|---|
| 5,380,060 A * | 1/1995 | Sponsler | ............... | B60N 2/3084 |
| | | | | 297/238 |
| 5,383,707 A * | 1/1995 | Osenkowski | ........ | B60N 2/3084 |
| | | | | 297/238 |
| 5,603,550 A * | 2/1997 | Holdampf | ............ | B60N 2/3013 |
| | | | | 297/238 X |
| 5,662,369 A | 9/1997 | Tsuge | | |
| 5,662,377 A * | 9/1997 | Holdampf | ............ | B60N 2/3013 |
| | | | | 297/238 X |
| 5,743,593 A * | 4/1998 | Vogt | ..................... | B60N 2/3084 |
| | | | | 297/238 |
| 6,048,027 A * | 4/2000 | Peck | ..................... | B60N 2/3084 |
| | | | | 297/238 |
| 6,572,188 B2 * | 6/2003 | Ozawa | ................. | B60N 2/4613 |
| | | | | 297/238 |
| 7,735,913 B2 * | 6/2010 | Crombez | ............. | B60N 2/4613 |
| | | | | 297/238 X |
| 7,988,229 B2 * | 8/2011 | Dill | .......................... | B60N 2/01 |
| | | | | 297/233 X |
| 8,308,238 B2 * | 11/2012 | Imaoka | ................... | B60N 2/688 |
| | | | | 297/234 X |
| 8,544,950 B2 * | 10/2013 | Merensky | ............ | B60N 2/3084 |
| | | | | 297/238 |

FOREIGN PATENT DOCUMENTS

| | | |
|---|---|---|
| CN | 102 673 430 A | 9/2012 |
| CN | 102 803 013 A | 11/2012 |
| DE | 197 35 253 C1 | 8/1998 |
| WO | 2008/029952 A2 | 3/2008 |

\* cited by examiner

SEAT SYSTEM FOR A VEHICLE

CROSS REFERENCE TO RELATED APPLICATIONS

This application is a United States National Phase Application of International Application PCT/EP2014/067434 filed Aug. 14, 2014 and claims the benefit of priority under 35 U.S.C. §119 of German Application 10 2013 224 605.6 filed Nov. 29, 2013 the entire contents of which are incorporated herein by reference.

FIELD OF THE INVENTION

The invention relates to a seat system for a vehicle, the system comprising at least two seats which are arranged one beside the other.

BACKGROUND OF THE INVENTION

The prior art discloses vehicle-seat systems which comprise a plurality of seats which are arranged one beside the other and of which at least one or more can be unlocked by means of remote triggering.

SUMMARY OF THE INVENTION

It is an object of the present invention to specify a particularly safe seat system for a vehicle with remote triggering for unlocking individual seats of the seat system.

The object is achieved according to the invention by a seat system for a vehicle, the system comprising a plurality of seats which are arranged one beside the other, wherein at least one of the seats is configured such that, in the event of unlocking and said seat, in particular the backrest thereof, being pivoted beyond a predetermined angle of inclination, an adjacent seat is blocked in the unlocked state or at least a folding action of the backrest thereof is damped or blocked.

The invention ensures that, when a backrest of one of the seats has already been folded down, it is not possible, when the unlocking, in particular the remote unlocking, of another seat adjacent to said seat is actuated, for this adjacent seat to be automatically folded down or to have its backrest inclined. For this purpose, when the adjacent seat has already been folded, the adjacent seat which has not yet been folded down is spring-loaded in relation to said folded seat.

This increases in particular safety when remote unlocking for the adjacent seat which has not yet been folded is actuated, and at least reduces, or even avoids, the risk of injury stemming from undesired automatic inclination of the unlocked adjacent seat.

In a development of the invention, the seat system comprises a plurality of different-width seats which are arranged one beside the other, wherein that seat which is of smaller width is configured such that, in the event of unlocking and of said seat, in particular the backrest thereof, being pivoted beyond a predetermined angle of inclination, an adjacent seat, which is of greater width, is blocked in the unlocked state or at least a folding action of the backrest thereof is damped.

One possible embodiment makes provision for a seat which is the first to be pivoted to be configured such that, as it is being pivoted, a frictional force acting between the pivoting seat and the adjacent seat is increased, in particular is increased as the rotation or pivoting of the seat which is to be pivoted increases. For this purpose, a spring device and/or damping device, in particular a wrap spring, is arranged in the region of the pivot axis of the seat which is the first to be pivoted, in particular of the smaller-width seat.

In one possible embodiment of the seat system, the latter comprises a plurality of seats which are arranged one beside the other and of which at least two are pivotable about a common pivot axis. The seats arranged one beside the other are connected here, in the region of the common pivot axis, by means of a shaft or a transmission element, wherein one of the two seats is arranged in a rotatable manner on the shaft and the other seat is arranged in a rotationally fixed manner on the shaft.

In particular the smaller-width seat of the at least two pivotable seats is arranged here in a rotatable manner on the shaft and is configured such that, in the event of unlocking and the backrest thereof being pivoted beyond a predetermined angle of inclination, the other, adjacent seat, which is of greater width, is blocked in the unlocked state or at least a folding action of the backrest thereof is damped or blocked.

For this purpose, the other, adjacent seat, which has not yet been folded down and has a backrest in the sitting position or design-specific position, is spring-loaded in relation to the pivoted seat, of which the backrest has already been folded down.

One embodiment makes provision for a spring device and/or damping device to be arranged in the region of the common pivot axis of the seat which is to be pivoted. For example, the spring device and/or damping device comprises, as its spring element, at least one wrap spring or a helical torsion spring. At one end, the spring element is supported in a rotationally fixed manner on the seat part and, at the other end, the spring element is supported on the backrest. In the event of a pivoting movement of the backrest, the end which is supported on the backrest is carried along, as a result of which the spring element is subjected to stressing, in particular contracts.

Arranging the spring element in the region of the common pivot axis, in particular on the shaft which couples the two seats, means that, in the event of pivoting of the backrest of the first seat which is to be folded, and is arranged in a rotatable manner on the shaft, in particular of the narrower seat, the spring element, which is being subjected to stressing, positions itself against the shaft and is wound around the latter to a pronounced extent and is contracted. The result of this is that, when the backrest of the other, adjacent seat, which is arranged in a rotationally fixed manner on the shaft, is subsequently folded or pivoted, the shaft is rotated. By virtue of the shaft rotating, a frictional force within the spring element, which butts against the shaft and is prestressed by virtue of the backrest of the first seat being folded, counteracts the pivoting movement of the other, adjacent seat, and said frictional force is increased as the pivoting movement of said other, adjacent seat increases, and therefore the folding-down action of the backrest of the other, adjacent seat can be damped, or even avoided. As a result, when the in particular central or narrower seat has already been folded, remote unlocking of the other, adjacent seat can be followed by a damped and slow folding-down action, or locking, of the backrest, and therefore the risk of injury is reduced or avoided.

It is additionally possible for the spring device and/or damping device to comprise, as its damping element, at least one guide sleeve or friction clamp for further increasing and adjusting the frictional force which, when the backrest of the one seat has already been folded down, counteracts the folding-down movement of the backrest of the adjacent seat as the latter is being folded down. The guide sleeve or friction clamp here at least partially or completely encloses the shaft in the region of the pivot axis.

The spring element and/or the guide sleeve and/or the friction clamp are/is correspondingly designed in accordance with the frictional force to be adjusted, in particular in dependence on the properties of the backrest, such as size, weight and dimensions. In one possible embodiment, the spring element encloses, in particular wraps around, the guide sleeve or friction clamp over the entire longitudinal extent. In this exemplary embodiment, the one spring end is retained on one side of the seat and the opposite spring end is retained on the other, opposite side of the seat, wherein one spring end is mounted on a seat part and the other is mounted on the backrest.

As an alternative, it is possible for the spring element to enclose, in particular wrap around, just an end region of the shaft and a guide sleeve or friction clamp arranged on said end region of the shaft. In this exemplary embodiment, the two spring ends are retained in the region of one side of the seat, wherein one spring end is fixed on the seat part, for example on a flange or lower fitting part. The other, backrest end of the spring is retained, for example, on a carry-along pin which projects from the common shaft, and is thus mounted on the shaft, and/or on a carry-along pin which projects from the backrest, and is thus mounted on the backrest. In the event of a pivoting movement of the backrest of the seat which is arranged in a rotatable manner on the common shaft, the backrest end of the spring is carried along, and prestressed, by the backrest-mounted carry-along pin. In the event of a pivoting movement of the shaft-mounted backrest, which is arranged in a rotationally fixed manner on the common shaft, and therefore in the event of rotation of the shaft, the backrest end of the spring is carried along, possibly after executing an amount of free travel, by the shaft-mounted carry-along pin, and therefore the already prestressed spring element is subjected to further stressing and the guide sleeve or the friction clamp positions itself to a greater extent against the shaft.

As a result, the guide sleeve (or the friction clamp) and the shaft are in contact and move relative to one another in the event of the pivoting movement of the shaft-mounted backrest, whereby dynamic friction, in particular sliding friction, gives rise to a frictional force which counteracts the pivoting movement of the shaft-mounted backrest and is increased as the pivoting movement increases.

In a further embodiment, the guide sleeve or the friction clamp is slit along its longitudinal extent. This makes it possible specifically for the frictional force which counteracts the pivoting movement to be adjustable and predeterminable.

The advantages achieved by the invention reside in particular in that, when a backrest of one of the seats arranged on a common rotary shaft has already been folded, it is not possible, in the event of remote unlocking of a not-yet-folded backrest of the other, adjacent seat, for the backrest of said other, adjacent seat to be folded down or inclined in an automatic and uncontrolled manner. Therefore, the risk of injury stemming from an uncontrolled folding-down action of a backrest which is unlocked remotely is at least reduced, or even avoided.

Exemplary embodiments of the invention will be described in more detail hereinbelow with reference to the accompanying schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Parts which correspond to one another have been provided with the same reference signs in all the Figures.

Figure 1:
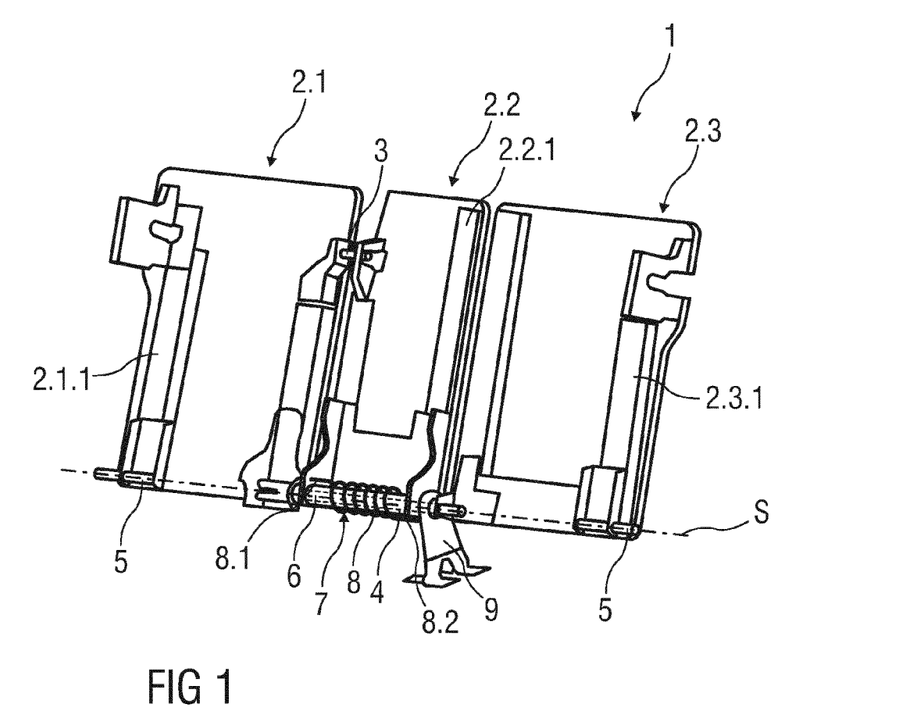
FIG. 1 is a schematic perspective view of part of a seat system.

FIG. 1 shows a perspective view of part of a seat system 1 for a vehicle. The vehicle may be a passenger vehicle or some other vehicle comprising a plurality of seats 2.1 to 2.3 which are arranged one beside the other, wherein said seats form a row of seats. If there are a number of rows of seats, for example a front row of seats for a driver and a front passenger and one or more rows of rear seats for other passengers, in the vehicle, for example in a van or SUV (sport utility vehicle), then it is possible for at least one of the seats 2.1 to 2.3 to be temporarily positioned, or moved, such that either there is more stowage space available in the vehicle interior or a passenger is better able to get in or out.

The seat system 1 comprises a plurality of seats 2.1 to 2.3 which are arranged one beside the other and of which respectively associated backrest carriers 2.1.1 to 2.3.1 are illustrated. Associated seat-cushion or seat-surface carriers, in relation to which the backrest carriers 2.1.1 to 2.3.1 are pivotable, in particular foldable, about a pivot axis, are not illustrated specifically. The backrest carriers 2.1.1 to 2.3.1 and the seat-surface carriers are padded, in a manner which is not illustrated specifically.

Depending on the embodiment, it is possible for the backrest carriers 2.1.1 to 2.3.1 to be pivoted forward into a stowage position, and therefore the backrest is folded all the way forward into a generally horizontal position, in which it rests on the seat surface. It is possible here for the backrests to be pivoted together or separately. In the use position or sitting position of the seats 2.1 to 2.3, the backrest carriers 2.1.1 to 2.3.1 thereof, as illustrated, are set in an essentially vertical/upright or slightly inclined position and are connected to one another for example by means of a releasable locking element 3, for example a catch.

Depending on the embodiment of the vehicle, the seats 2.1 to 2.3 of a row of seats, and therefore adjacent seats 2.1 to 2.3, may be of the same width or different widths.

In the exemplary embodiment according to FIG. 1, the central seat 2.2 is of a smaller width than the laterally adjacent seats 2.1 and 2.3. In respect of the row of seats, the central seat 2.2 is of a smaller width of, for example, 20% in relation to the adjacent seats 2.1, 2.3, each of a greater width of, for example, 40% (in respect of a row of seats with a 100% seat system).

For the purpose of pivoting the individual backrest carriers 2.1.1 to 2.3.1 relative to the respective seat surface between a sitting position and a stowage or loading position, at least one shaft 4 is arranged in the region of the pivot axis S. The shaft 4 is mounted by means of a bearing in lateral bearing bushes of the seat surface/s.

In the exemplary embodiment according to FIG. 1, the shaft 4 extends over the entire width of the seat 2.2 and beyond the bearing of the relevant seat 2.2 into the bearing of the adjacent seat 2.1, 2.3 on the relevant side. In the exemplary embodiment according to FIG. 1, the backrest carriers 2.1.1 and 2.2.1 are arranged together on the shaft 4 (also referred to as pivot shaft), wherein at least the central seat 2.2 is arranged in a rotatable manner on the shaft 4 and at least one or both adjacent seats 2.1 and 2.3 are arranged in a rotationally fixed manner on the shaft 4.

As an alternative, or in addition, it is possible for the backrest carriers 2.1.1 to 2.3.1 to be arranged in a pivotable manner on the respective seat surface by means of separate rotary pins 5.

It is possible here for the shaft 4 to be enclosed by a bearing sleeve or guide sleeve 6. The guide sleeve 6 is produced, in particular, from plastics material. As an alternative, it may be a separate component, in particular a connecting rod or tube. In the exemplary embodiment according to FIG. 6, the guide sleeve 6 extends essentially over the entire length of the common shaft 4, between the lateral bearings for the latter on the seat 2.2 in the lower region of the relevant backrest carrier 2.2.1.

In order to pivot individual seats 2.1 to 2.3 forward into a stowage position, the seats 2.1 to 2.3, in a manner which is not illustrated specifically, have a lockable pivoting mechanism, which is unlockable/releasable by means of remote triggering, wherein generally each seat 2.1 to 2.3 has a separate lockable pivoting mechanism, which is separately releasable.

In the case of unlocking of the pivoting mechanism of one of the seats 2.1 to 2.3, in the exemplary embodiment central seat 2.2, the invention makes provision for the backrest of said seat therefore to be pivotable in the forward direction automatically or manually. The seat 2.2 here is configured such that, in the event of unlocking and said seat 2.2 being pivoted beyond a predetermined angle of inclination, an adjacent seat 2.1 or 2.3, in the exemplary embodiment the adjacent seat 2.1, is blocked in the unlocked state, in particular pivoting of the backrest thereof is at least impeded, in particular damped, or even prevented.

This means that, when the central seat 2.2 has already been folded down and the unlocking, in particular remote unlocking of the adjacent seat 2.1 is actuated, said adjacent seat 2.1 is not folded down or inclined automatically or automatic inclination of the backrest is at least limited or damped. This increases in particular safety when the remote unlocking is actuated, and the risk of injury stemming from undesired automatic inclination, or a folding action of the backrest of the unlocked adjacent seat 2.1, is at least reduced or damped, or even avoided.

In order to achieve such a blocking or damping action of subsequent inclination of the backrest of the adjacent seat 2.1, when the seat 2.2 has already been pivoted, said central seat 2.2 comprises a spring device and/or damping device 7. The spring device and/or damping device 7 comprises at least one spring element 8. The spring element 8 is designed in the form of a wrap spring, in particular a helical torsion spring. The spring device and/or damping device 7 is produced, in particular, from metal.

The spring device and/or damping device 7 additionally comprises the guide sleeve 6. The spring element 8 encloses, or wraps around, the shaft 4 here, in particular the guide sleeve 6 thereof, or some other connecting rod. It is possible here for the spring element 8 and the guide sleeve 6 to be formed from metal. As an alternative, the guide sleeve 6 may be formed from plastics material.

In the case of the spring element 8 extending essentially over the entire longitudinal extent of the common shaft 4, between the lateral bearings of the latter on the seat 2.2, one spring end 8.1 is mounted on the backrest, on a lower side region of the associated backrest carrier 2.2.1, and the other spring end 8.2 is mounted on the opposite side of the seat 2.2, on a floor flange 9 or a floor-mounted lower fitting part.

Figure 2A:
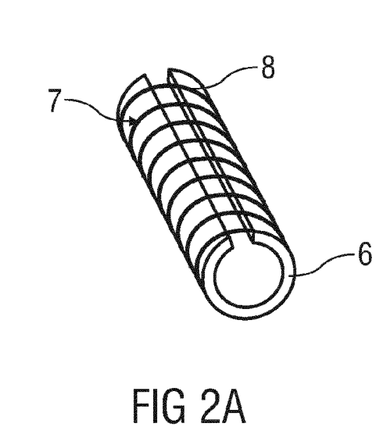
FIG. 2A is a schematic perspective view of one of different embodiments of a spring device and/or damping device which wraps around a shaft bearing.
Figure 2B:
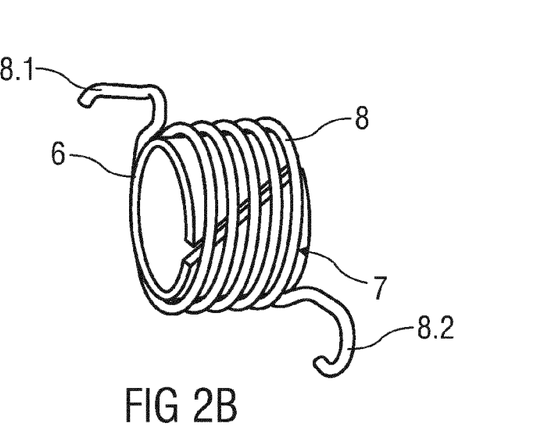
FIG. 2B is a schematic perspective view of another of different embodiments of a spring device and/or damping device which wraps around a shaft bearing.

FIGS. 2A and 2B show different exemplary embodiments of a spring device and/or damping device 7 which wraps around the guide sleeve 6 and has a spring element 8 designed in the form of a wrap spring. It is possible here, instead of a guide sleeve 6 of the shaft 4, to make use of a friction clamp, in particular a slit spring clamp of low elastic strength, which damps the pivoting movement of the shaft-mounted backrest of the adjacent seat 2.1 by way of frictional forces. As the pivoting movement of the backrest of the seat 2.1 progresses here, the spring element 8 is subjected to further stressing and therefore the guide sleeve 6 or the friction clamp is pushed to a greater extent against the shaft 4 and the frictional force is correspondingly increased, and adjusted, further.

The guide sleeve 6 is slit in order for the achievable frictional force counteracting a pivoting movement to be adjusted. It is possible here for a slit 6.1 to run rectilinearly (=FIG. 2A) or obliquely (=FIG. 2B) along the longitudinal extent of the guide sleeve.

The spring device and/or damping device 7, at least comprising the guide sleeve 6 and/or the spring element 8, damps and/or blocks the movement of the backrest of the adjacent seat 2.1 here from the upright position into the stowage position when the central seat 2.2, in particular the backrest thereof, has already been folded from the upright position into a position which is inclined in the forward direction beyond a predetermined angle of inclination, in particular into a stowage position.

For this purpose, the seat 2.2 which is the first to be pivoted is configured such that, as it is being pivoted, a frictional force acting between the pivoting seat 2.2 and the adjacent seat 2.1 is increased, in particular is increased as the rotation or pivoting of the seat 2.2 which is to be pivoted increases. For this purpose, the spring device and/or damping device 7 with the spring element 8, in particular a wrap spring, is arranged in the region of the pivot axis S of the seat 2.2 which is to be pivoted, wherein the spring element 8 of the spring device and/or damping device 7 wraps around the guide sleeve 6 or friction clamp.

In the normal position or sitting position of the backrest of the seat 2.2, the spring device and/or damping device 7, in particular the spring element 8, is relieved of stressing. One end (=spring end 8.1) of the spring device and/or damping device 7 here is fastened on the backrest or sleeve. This end of the spring device and/or damping device 7 rotates along as the backrest of at least one of the seats 2.1 and 2.2, or of both seats 2.1 and 2.2, pivots. The other, in particular opposite end (=spring end 8.2) of the spring device and/or damping device 7 is fastened on the seat surface or vehicle, in particular the floor, or on one of the adjacent seats 2.1 or 2.3 and is thus rotationally fixed.

If, following unlocking of the seat 2.2, the backrest of the latter is pivoted in the forward direction, then the spring device and/or damping device 7, in particular the spring element 8, contracts. The spring device and/or damping device 7, in particular the spring element 8, preferably contracts as from an inclination of the backrest in relation to the surface of the seat 2.2 of greater than 20% in relation to the normal position or sitting position, wherein the frictional force which acts on the guide sleeve 6, in particular between the guide sleeve 6 and the common shaft 4, increases further, and counteracts the pivoting movement, as the pivoting or inclination of the backrest of the seat 2.2 increases.

As an alternative, it is possible for the spring device and/or damping device 7 to contract as soon as there is an adjustment in inclination from the normal position or sitting position.

On account of the common shaft 4 and of the guide sleeve 6 or the connecting rod extending beyond the central seat 2.2 into the bearing arrangement of the adjacent seat 2.1, it is possible, when the central seat 2.2 has already been inclined and therefore the spring device and/or damping device 7 has been contracted or subjected to stressing in part or in full, for the adjacent seat 2.1, in particular the backrest thereof, not to be pivoted (in the case of the spring element 8 being subjected to full stressing), or to be pivoted only with pronounced damping, on account of the frictional force which acts on the shaft 4 and the guide sleeve 6. This ensures that, when the central seat 2.2 has already been pivoted and there is subsequent unlocking, in particular remote unlocking, of the adjacent seat 2.1, the backrest of the latter is not pivoted forward automatically or at least pivoting of the backrest is damped to a pronounced extent, as a result of which safety is increased.

In an alternative embodiment, the spring device and/or damping device 7, in particular the spring element 8 and/or the guide sleeve 6, may be arranged and configured such that, once the central seat 2.2 has been pivoted into the stowage position and the adjacent seat 2.1 has then been unlocked, said device is subjected to further stressing and contracted by virtue of the backrest of the seat 2.1 being pivoted, and therefore the pivoting of the backrest of the seat 2.1 is damped to a further extent and possibly, as from a predetermined angle of inclination, for example when an inclination of the backrest of 40° or 60° is reached, is blocked. For this purpose, the one backrest end (=spring end 8.1) of the spring device and/or damping device 7 is positioned on the backrest of the seat 2.2 or on the common shaft 4, or on the guide sleeve 6 which is rotatable therewith.

If, on the other hand, the remote unlocking of the outer seat 2.1 is actuated when the central seat 2.2, in particular the backrest thereof, is in the use position/sitting position, and therefore the spring device and/or damping device 7 is relieved of stressing, it is possible for the backrest of the outer seat 2.1 to be pivoted automatically or manually from the use position/sitting position into a forwardly inclined position, in particular a stowage position. In this case, the spring device and/or damping device 7 is relieved of stressing when remote unlocking takes place, and therefore it is only when the backrest carrier 2.1.1 begins to pivot that the pivoting movement is damped slightly by virtue of the as yet unstressed spring element 8 being subjected to stressing and of the guide sleeve 6 and common shaft 4, which are not initially in contact, subsequently coming into contact.

Figure 3:
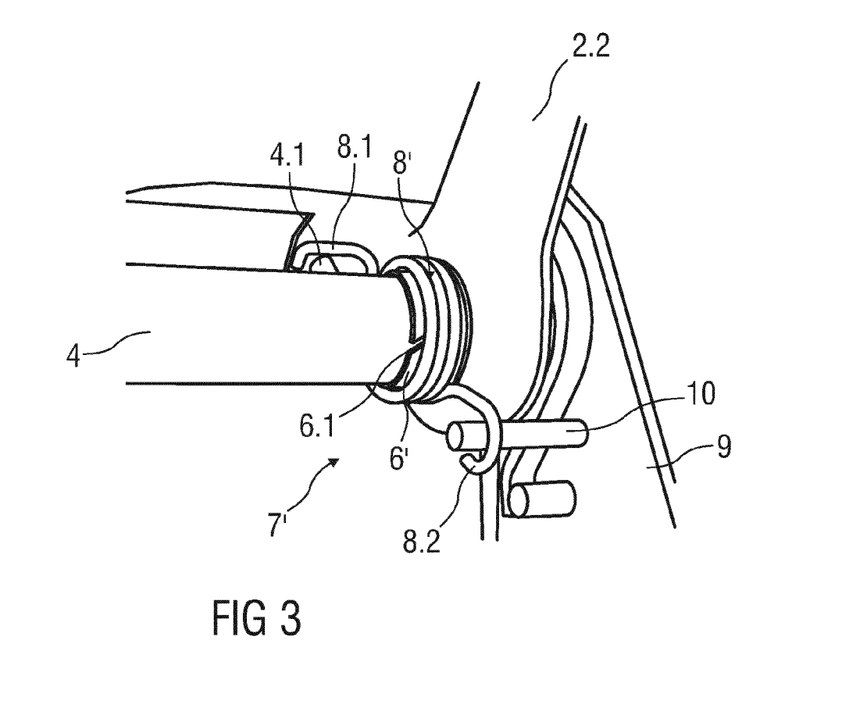
FIG. 3 is a schematic enlarged illustration of an alternative embodiment of a spring device and/or damping device in a starting position with the backrests vertical.

FIG. 3 shows, schematically, an enlarged illustration of an alternative embodiment of a spring device and/or damping device 7' in a starting position with the backrests of the seats 2.1 to 2.3 upright (as illustrated in FIG. 1).

The spring device and/or damping device 7' comprises at least one spring element 8', which is designed in the form of a wrap spring or helical torsion spring and is arranged only on one side of the seat 2.2, in the region of the bearing of the common shaft 4 of the seats 2.1, 2.2. The spring element 8' is significantly shorter than the spring element 8 according to FIGS. 1 and 2 and is arranged in a wraparound state on a short guide sleeve 6' (or friction clamp), which is arranged in the region of the bearing on the common shaft 4. In the sitting position or normal position/design-specific position of the backrest of the seat 2.2, the backrest end 8.1 of the spring is articulated on a shaft-mounted carry-along pin 4.1.

The guide sleeve 6', which is provided with a slit 6.1, is arranged between the shaft 4 and spring element 8' in order to adjust the frictional force which is to be achieved, which is intended to counteract a pivoting movement of the adjacent seat 2.1.

The seat-part end 8.2 of the spring is articulated on a retaining pin 10 so as to be mounted on the seat part or on the floor flange 9.

Figure 4:
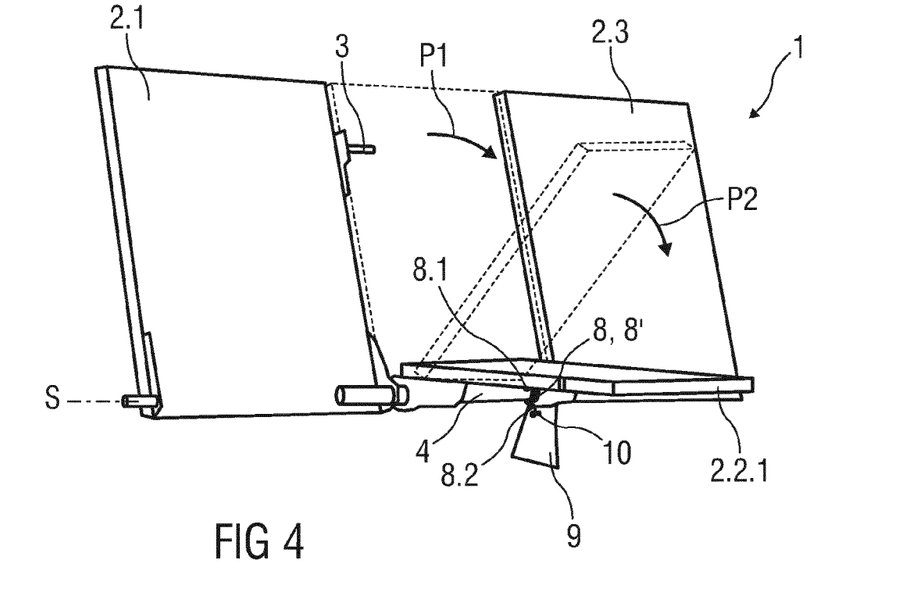
FIG. 4 is a schematic perspective illustration of a seat system with the backrest of one of the seats folded down.

FIG. 4 shows, schematically, a perspective illustration of the seat system 1 with a backrest of the central seat 2.2 folded all the way down (=solid-line illustration) from a vertical position via an intermediate position (=dashed-line illustration) by way of a pivoting movement according to arrows P1 and P2.

Figure 5:
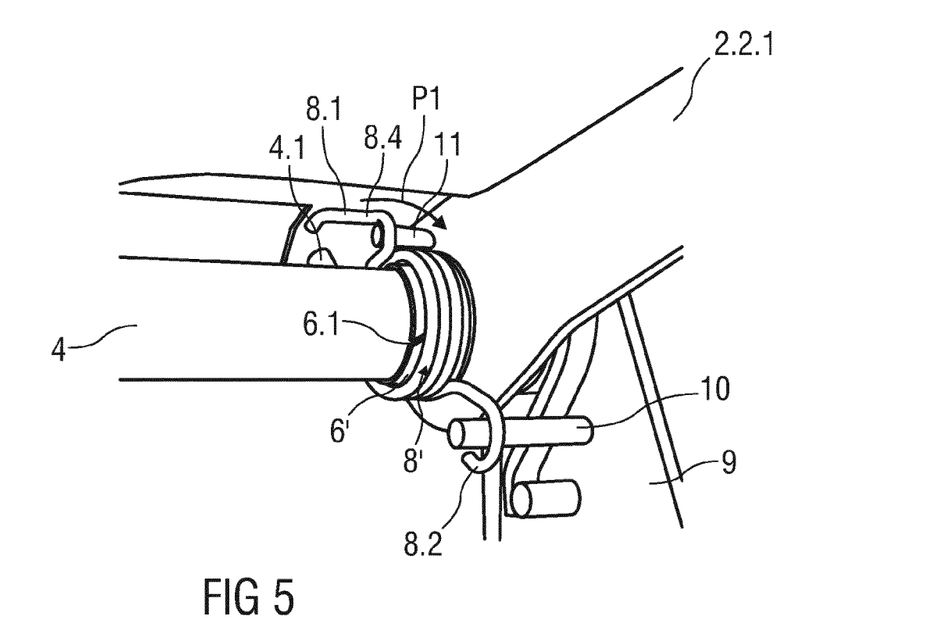
FIG. 5 is a schematic enlarged illustration of the state of the spring device and/or damping device when the backrest of the associated seat has been folded down.

As shown in FIG. 5, as the backrest, and therefore the backrest carrier 2.2.1, is being pivoted according to arrows P1 and P2 from the vertical position (=sitting position or design-specific position) into the intermediate position, the spring element 8' is prestressed by virtue of the backrest end 8.1 of the spring being carried along by means of a backrest-mounted carry-along pin 11.

Depending on how the backrest-mounted carry-along pin 11 is arranged, it can carry along the backrest end 8.1 of the spring, and therefore subject the spring element 8' to stressing, throughout the pivoting movement. As an alternative, it is possible for the backrest-mounted carry-along pin 11 first of all to travel freely according to arrow P1, up to a predetermined inclination of the backrest carrier 2.2.1 and only when an intermediate position has been reached to come into abutment against the backrest end 8.1 of the spring and to carry said end along and thus at least prestress the spring element 8'.

As shown with reference to a comparison of FIGS. 3 and 5, the guide sleeve 6' is clamped, and pushed onto the shaft 4, as the backrest carrier 2.2.1 is pivoted and the backrest end 8.1 of the spring is carried along, and the spring element 8' is therefore subjected to stressing, and so the slit 6.1 of the guide sleeve 6' is closed in part (for example while being carried along during the pivoting movement according to arrow P2) or is closed largely in full (for example while being carried along during the full pivoting movement according to arrows P1 and P2).

As an alternative, the slit 6.1 of the guide sleeve 6' or friction clamp may be designed and configured such that, even while the backrest end 8.1 of the spring is being carried along throughout the entire pivoting movement of the backrest carrier 2.2.1 according to arrows P1 and P2, the slit is not closed.

Also shown is a sleeve-mounted or shaft-mounted carry-along pin 4.1 in the starting position, in which the spring element 8' is not articulated thereon.

Figure 7:
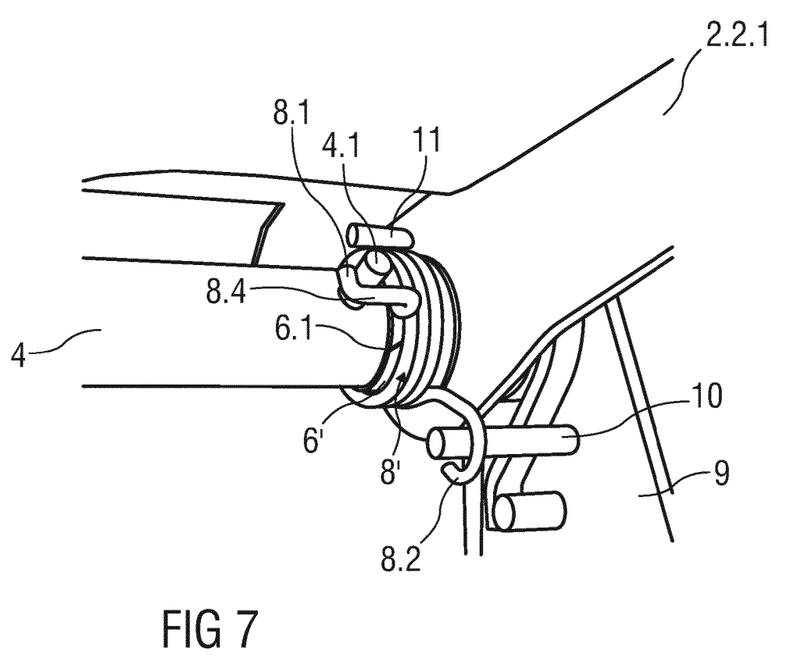
FIG. 7 is a schematic enlarged illustration of the state of the spring device and/or damping device when two backrests of two adjacent seats have been folded down.

For this purpose, the backrest end 8.1 of the spring is bent appropriately, wherein a first bend 8.3 serves for the articulation of the backrest-mounted carry-along pin 11 and a second bend 8.4 serves for the articulation of the shaft-mounted carry-along pin 4.1 (as shown in FIG. 7).

Figure 6:
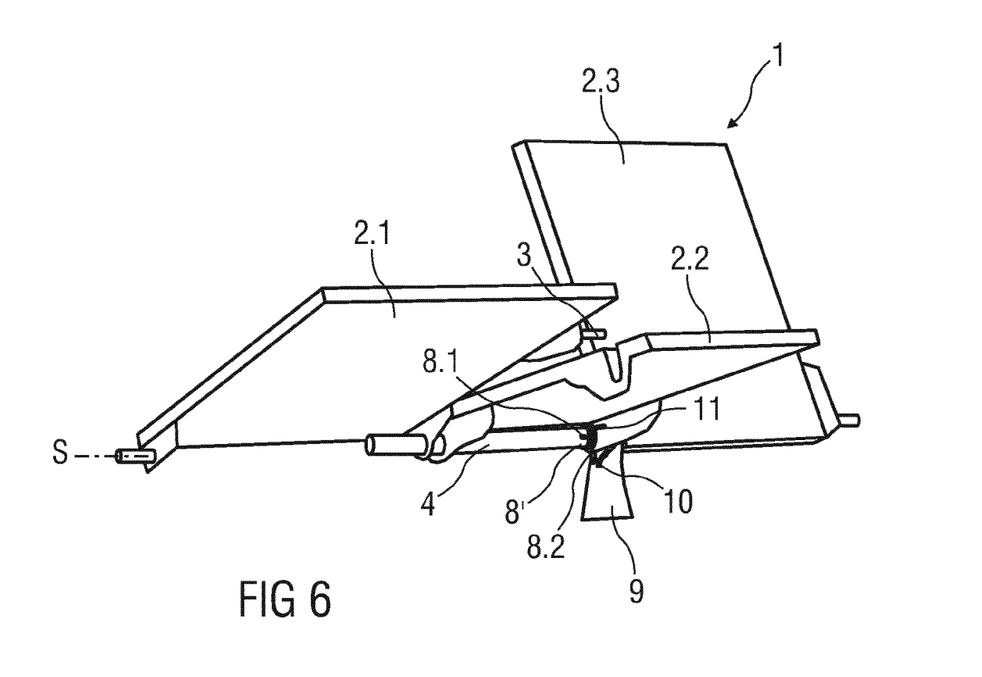
FIG. 6 is a schematic perspective illustration of a seat system with the backrests of two adjacent seats folded down.

FIG. 6 shows the seat system 1 with the backrests of two adjacent seats 2.1 and 2.2 folded down.

As described above, in the first instance the backrest carrier 2.2.1 of the central seat 2.2 is folded, as a result of which, by virtue of the backrest end 8.1 of the spring being carried along by means of the backrest-mounted carry-along pin 11, the spring element 8' is prestressed at least in part or in full.

Following unlocking, in particular remote unlocking, of the backrest carrier 2.1.1 of the adjacent seat 2.1, which is arranged in a rotationally fixed manner on the shaft 4, the backrest carrier 2.1.1 is spring-loaded in relation to the seat 2.2 by the prestressed spring element 8' and therefore a subsequent pivoting movement of the backrest carrier 2.1.1 is damped (in the case of the spring element 8' being partially prestressed) or avoided (in the case of the spring element 8' being subjected to full stressing).

When the unlocked backrest carrier 2.1.1 is being pivoted, rotation of the shaft 4 causes the shaft-mounted carry-along pin 4.1 to be rotated. In this case, the shaft-mounted carry-along pin 4.1, after executing a predetermined amount of free travel and thus following pivoting of the backrest carrier 2.1.1, comes into abutment, up to a predetermined angle of inclination, against the bend 8.4 at the backrest end 8.1 of the spring and carries along the backrest end 8.1 of the spring in the forward direction as pivoting continues, as a result of which the spring element 8' is subjected to further stressing and therefore a relatively high frictional force counteracts said pivoting movement and the latter is damped to a greater extent or even avoided.

FIG. 7 shows the shaft-mounted carry-along pin 4.1 butting against the bend 8.4. Depending on specifications, in particular not later than when the backrest carrier 2.1.1 has been folded all the way down, the slit 6.1 of the guide sleeve 6' is closed.

While specific embodiments of the invention have been shown and described in detail to illustrate the application of the principles of the invention, it will be understood that the invention may be embodied otherwise without departing from such principles.

The invention claimed is:

1. A seat system for a vehicle, the system comprising:
a plurality of seats which are arranged one beside another, each of the plurality of seats comprising a seat part and a backrest, at least two of the plurality of seats being independently pivotable about a common pivot axis, wherein at least one of the at least two seats pivotable on the common pivot axis is configured such that, in the event of an unlocking and the backrest thereof being pivoted from a normal or seating position beyond a predetermined angle of inclination into a forward position, an adjacent seat of the at least two seats pivotable on the common pivot axis is blocked in an unlocked state or a folding action of the backrest thereof is damped or blocked, wherein a spring device or a damping device or both a spring device and a damping device is arranged in a region of the common pivot axis of the at least one of the plurality of the seats which is to be pivoted.

2. The seat system as claimed in claim 1, wherein a smaller-width seat of the at least two pivotable seats is configured such that, in the event of unlocking and the backrest thereof being pivoted beyond a predetermined angle of inclination, the other, adjacent seat, which is of greater width, is blocked in the unlocked state or at least a folding action of the backrest thereof is damped or blocked.

3. The seat system as claimed in claim 1, wherein the adjacent seat in the non-folded state, in the event of unlocking, is spring-loaded in relation to a pivoted seat.

4. The seat system as claimed in claim 1, wherein the spring device or the damping device or both the spring device and the damping device comprises a spring element, the spring element comprising at least one wrap spring.

5. The seat system as claimed in claim 1, wherein the spring device or the damping device or both the spring device and the damping device comprises a spring element, the spring element comprising at least one helical torsion spring.

6. The seat system as claimed in claim 1, wherein the spring device or the damping device or both the spring device and the damping device comprises a damping element, the damping element comprising at least one guide sleeve or friction clamp.

7. The seat system as claimed in claim 6, wherein the guide sleeve or the friction clamp is slit.

8. The seat system as claimed in claim 6, wherein:
the spring device or the damping device or both the spring device and the damping device comprises a spring element; and
the spring element wraps around the guide sleeve or the friction clamp.

9. The seat system as claimed in claim 1, wherein the spring element has one spring end articulated on the backrest of the at least one of the seats which is to be pivoted and has another spring end articulated on the seat part of the at least one of the seats.

* * * * *